United States Patent Office 3,679,351
Patented July 25, 1972

3,679,351
ATTENUATION OF THERMAL RADIATION
WITH PHOTOTROPIC DYES
Leonard Weissbein, Bridgewater Township, Somerset County, and Samuel James O'Brien, Dunellen, N.J., assignors to American Cyanamid Company, New York, N.Y.
No Drawing. Filed Dec. 7, 1961, Ser. No. 157,837
Int. Cl. D06p 1/18, 3/28, 3/44
U.S. Cl. 8—50                                    3 Claims

ABSTRACT OF THE DISCLOSURE

Objects, particularly cyanoethylated cellulose, cellulose acetate or nylon textile materials, are protected from the effects of incident, high intensity flash radiation by coloring them with certain phototropic azo dyes which upon exposure to said radiation exhibit a substantially instantaneous change to a white or colorless condition and which upon ceasation of exposure to said radiation revert rapidly to their original color.

---

This invention is concerned with colored fabrics and other substrates capable of reflecting a large percentage of incident high-intensity radiation, more particularly without permanent change in the normal color intensity of the substrate-color system. It further relates to methods for providing such colored substrates and to the protection of an object from the effects of such radiation by interposing a barrier comprising such colored substrates between the source of such radiation and the object to be protected. Still more specifically, the invention is further concerned with certain textile fabrics and other substrates colored with a selected group of phototropic disperse dyes.

Phototropism in dyes is not a property newly discovered with this invention. As used in this discussion, the term "phototropic" dyes is used to designate only dyes having certain specific reversible phototropic properties. Only such dyes are so-designated herein as are reversibly phototropic to the extent that when exposed to flash radiation of high intensity, exceeding that in normal sunlight, the color intensity of the dyed substrate will substantially instantaneously approach a white or colorless condition; but, when high-intensity radiation has ceased, the original color intensity will rapidly return in normal sunlight.

A major object of this invention is to provide protection of personnel and equipment from incident, high-intensity, flash radiation such, for example, as that corresponding to radiation from a black body radiator at about 6500° K. Such radiation, whether accidentally or intentionally produced, poses protective problems important both to civil and military authorities. Such protection can be offered in part by providing a protective barrier or coating which is best adapted to reflect a major portion of such incident radiation.

Such reflectance is best offered by surfaces which approach a white or colorless condition. Yet for many reasons, whether in clothing, in protective covering sheets or in surface coatings, it is neither practical nor desirable that such color intensity be permanent. For example, in military usage white uniforms have obvious disadvantages and use of color for camouflage purposes would be precluded. There is, therefore, a need for protective material colored with dyes and/or pigments having the specific rapid phototropic properties above-described.

While the present invention contemplates protective films and sheets, protective paints and the like, the problem is typically presented in textile materials suitable for clothing, protective cover cloths and the like. Accordingly, herein, colored textile materials are discussed as illustrative. The invention, however, is not limited thereto. A textile or other material to be colored is referred to as the "substrate." Therefore, the invention may be said to be concerned with the development of novel "substrate-dye systems."

A textile material, as the illustrative substrate, should meet certain criteria. It should not be developed from fibers which are excessively sensitive to heat, i.e., it should be neither readily destroyed by fusion nor be readily ignited. It should have high abrasion resistance and good tensile strength properties. The substrate-color system should be capable of reflecting from about 60 to about 90 percent of the incident high-intensity radiation. The normal color intensity should not be permanently impaired.

A substrate-color system capable of meeting these criteria is provided by the present invention. The requirements have been met to a surprisingly successful degree despite the fact it would appear difficult, if not impossible, to devise even a system which only accomplished a compromise of the stated limitations. In general, the desired system is provided by a substrate which comprises cyanoethylated cellulose in major proportion. Such substrates are colored with certain disperse dyes of specific structural characteristics. In general, also, they are members of a class of dyes most commonly used in dyeing cellulose esters such as the acetate and the like.

Further and more specific amplification of this discussion requires a separate discussion of both dye and substrate materials. In this connection the suitable dyestuffs will be considered first.

As noted above, phototropism is not a newly observed phenomenon. Normally, phototropism is defined as the reversible change in color of a substance when exposed to ordinary light. As such, it is quite well known in the dyestuff industry, particularly with respect to cellulose acetate dyes. In one study of some 160 dyes in solution and/or on a substrate, about 10% showed phototropism.

Vickerstaff, in his "The Physical Chemistry of Dyeing," 2nd edition (p. 326), states that phototropism occurs only on cellulose acetate and not on other substrates. Mullin in "Acetate Silk and Its Dyes," 1927 (p. 123), reported that phototropism is found almost wholly on acetate silk and that it is not usually found when the same color is used on other fibers. This type of phototropism is visible to the eye, the color becoming darker or lighter in intensity, and the change occurs in light of normal brightness such as sunlight.

Ordinarily, phototropism is considered an undesirable property, even though the rate of change in color intensity is relatively slow. Accordingly, if a dye is found to be subject to this effect, ordinarily it is not recommended for use and may not even be marketed. Therefore, even normal phototropism as a property of dyed fabrics is not one which is commonly observable by the general public.

In contrast to this classical or "normal" type of phototropism, the present invention is concerned only with obtaining a very rapid, reversible change in the color of a dyed fabric. It must occur very rapidly preferably in less than about one-tenth of a second, when the fabric is exposed to very high intensity radiation, i.e., of 10–25 cal./cm.$^2$/sec. or more. It does not occur when the dyed fabric is exposed to normal sunlight. Relatively, the latter is of low intensity, i.e., about 0.2 cal./cm.$^2$/sec. or less. Also, color changes caused by high-intensity radiation are quickly reversed, even in the presence of sunlight, when the high-intensity radiation is removed. This type of rapid phototropism has not been previously observed or studied. The term "rapid" is used herein to distinguish the type of phototropism of this invention from the previously-known type which is objectionable in normal industrial usages.

In accordance with the present invention, a number of dyes have been found which, when present on or in a suitable substrate, exhibit the desired rapid phototropic properties. They are not equally effective on the various substrates. This will be discussed below.

In the tests below which constitute the illustrative examples of this invention, the dyes were applied to the test fabrics by the following procedure. A piece of the fabric to be dyed was placed in 40 parts of water per part of fabric at a temperature of 110° F. Sufficient disperse dye to give a medium to strong dyeing on the fabric, 1–2% on the weight of the fabric, dispersed in a small amount of hot water was then added. The temperature of the dye bath was then raised over 15 minutes to 180° F. and the dye bath was maintained at 180° F. for 60 minutes. The dyed fabric was then removed and rinsed in cold water and subsequently dried.

Certain disperse dyes, such as those illustratively shown in Table I (below) have the desired rapid phototropic properties. All are azo dyes. In developing this invention no dye which does not contain the azo linkage was found to show the desired rapid phototropic change. It is probable that the phototropic change involves a cis-trans isomerization about the azo linkage as represented by the scheme:

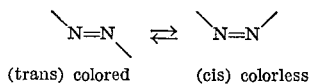

(trans) colored        (cis) colorless

The invention, however, is not intended to be limited to this theory of operation.

TABLE I

| Color index name (new series): | Color index number (new) |
|---|---|
| Disperse Orange 7 | 11240 |
| Disperse Red 13 | 11115 |
| Disperse Orange 3 | 11005 |
| Disperse Red 17 | 11210 |
| Disperse Red 1 | 11110 |
| Disperse Red 21 | — |
| Disperse Orange 17 | — |

It should be noted that the dyes of Table I are all commercial dyes for cellulose acetate and nylon fibers. As used thereon, they do not show the normal type of phototropism discussed above. Substantially no phototropic color change occurs in normal sunlight.

Since the dyes of choice were intended primarily for dyeing cellulose acetate fibers, screening was initially carried out on this substrate. For testing purposes, it was necessary to develop a suitable light source which would simulate the high-intensity radiation of interest. The method adopted was to employ solar radiation, concentrated by an f–6 lens of 14″ focal length, to produce a highly intense image of the sun. This image was about ⅛″ in diameter. Using this test, a relatively long list was obtained of dyes which exhibited the phototropic color change at intervals of 5–30 seconds of exposure. These exposure periods are far shorter than the ten-minute exposure to a bright light, or in a Fade-Ometer, as specified for "Tenative Test Method 32–1952 for Phototropism," recommended by the American Association of Textile Chemists and Colourists for screening dyeings intended for normal usage. Dyes which showed darkening were necessarily eliminated. Acid dyes, metallized acid dyes, mordant dyes and direct dyes were found unsuitable for use in the present invention.

Of the dyes on the longer list, when color change observations were made as rapidly as possible, i.e., at exposure time intervals of one second or less, the number was greatly reduced, substantially to those illustratively shown above in Table I. Only about a dozen, all capable of the cis-trans isomerization about the azo linkage, were found at all suitable.

These few dyes such as those of Table I, being originally intended primarily for normal dyeing of cellulose acetate and nylon, were tested as normal commercial dyeings on both these fiber types for the desired "rapid" phototropic properties. Of even these few, all were not equally effective on both substrates. Generally dyeings on nylons were less desirable for the present invention. Subsequently, dyeings on other fibers were made and tested. Of these additional dyeings, very few were found to exhibit the desired properties. In most cases they were even less effective than the dyeings on nylons.

A marked exception was found in the case of cyanoethylated cellulose fibers. Although cellulose acetate and cyanoethylated cellulose are both forms of modified cellulose, the modification is quite different. The former have ester groups, as for example in

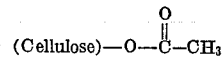

whereas the latter contain ether groups, as for example (Cellulose)—O—CH$_2$CH$_2$CN Other cellulose ether fibers were found unsuitable as substrates for the present invention.

It is surprising, therefore, to find cyanoethylated cellulose not only can be dyed with the disperse dyes of this invention, but was found preferable to all other fibers tested and comprises the substrate of choice. In order of preference, these are followed by blends with acetate or nylons in which cyanoethylated cellulose is present in major proportion. A group of comparative test results are shown in the following Table II.

TABLE II

|  | Cellulose acetate | Cyanoethylated cotton | Nylon |
|---|---|---|---|
| Disperse Orange 7 | P | P | P |
| Disperse Red 21 | P a | P | P c |
| Disperse Orange 17 | P | P | P |
| Disperse Red 13 | P b | P b | P c |
| Disperse Orange 3 | P b | P b | P b |
| Disperse Red 17 | P | P | P |
| Disperse Red 1 | P | P | P | a Dull.
b Slow.
c Poor.
Note.—P=Phototropic.

Blends of the suitable dyes, producing a wide range of colors, including dark shades and browns, give dyeings which retain the desired phototropism.

As noted above, for the purposes of this invention, textile materials should be resistant to heat and not melt or otherwise be destroyed in the presence of high-intensity flash radiation. Cellulose acetate and nylon are deficient in this respect, since they fuse at about 230° and 250° C., respectively. While cotton is excellent in this respect, it is not dyed by the dyes of this invention. Cyanoethylated cotton (cellulose) has even greater resistance to heat than does cotton itself. In addition, it has greater resistance to abrasion and to rot-causing bacteria.

Although cellulose acetate has been used to designate a known class of synthetic cellulose fibers, it is to be understood that chemically equivalent cellulose esters and blends of them may be used in this invention.

Cyanoethylation of cellulose is a well-known operation for modifying the fiber characteristics. It may be carried out before or after the fibers are formed into yarns and fabrics. At low degrees of cyanoethylation, the fibrous characteristics are retained and there is little optically observable change. Illustrative types of cellulose fibers include wood pulp, regenerated cellulose such as rayon and the like, and cotton. As discussed above, in the present invention the term "textile fabrics" contempaltes both woven and felted fabrics from such fibers, whether cyanoethylated before or after the fabric is formed. At high degrees of substitution, the fibrous characteristics disappear and an organic-solvent-soluble, plastic mass is obtained which can be made into colored coating compositions and applied as such. Self-sustaining colored films and sheets can also be formed by known methods and are also contemplated. Accordingly, the term "colored protective barrier" layer as disclosed and claimed herein may be derived from these various types of cellulose fibers and may take any of these various physical forms.

We claim:

1. A method of protecting objects from the effects of incident, high-intensity flash radiation corresponding to that from a black body radiatior about 6500° K., intensity above about five cal./cm.²/sec., which comprises: interposing between the source of said radiation and the object to be protected, a colored barrier layer, said barrier layer comprising a substrate selected from the group consisting of cyanoethylated cellulose, cellulose acetate and nylon, which substrate is colored with an azo dye selected from the group consisting of:

Disperse Orange 7,
Disperse Red 13,
Disperse Orange 3,
Disperse Red 17, and
Disperse Red 1

2. A method according to claim 1 in which said substrate is a textile fabric.

3. The method according to claim 1 wherein said substrate comprises a major proportion of cyanoethylated cellulose.

References Cited

UNITED STATES PATENTS

| 1,611,986 | 12/1926 | Baddiley et al. | 8—50 |
| 1,845,835 | 2/1932 | Frankenberger | 88—106 P |
| 2,794,186 | 6/1957 | Butters | 2—2.1 |
| 2,921,407 | 1/1960 | Wagner | 88—106 P |

OTHER REFERENCES

Stearns: Journal of the Optical Society of America, vol. 32, May 1942, pp. 282–284.

GEORGE F. LESMES, Primary Examiner

J. CANNON, Assistant Examiner

U.S. Cl. X.R.

8—2, 41 B, DIG 21; 96—90; 117—137; 250—108 FS; 350—160 P